Feb. 7, 1956 ICHIRO MURATA 2,733,519
DEEP WELL SURVEYING INSTRUMENT
Filed Oct. 9, 1952 2 Sheets-Sheet 2
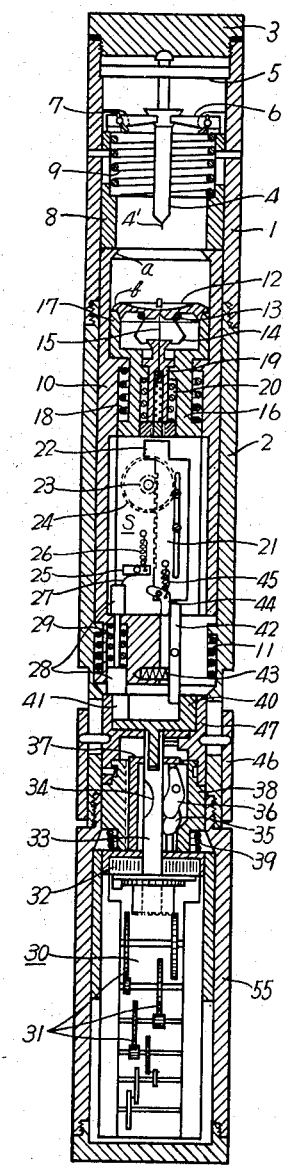
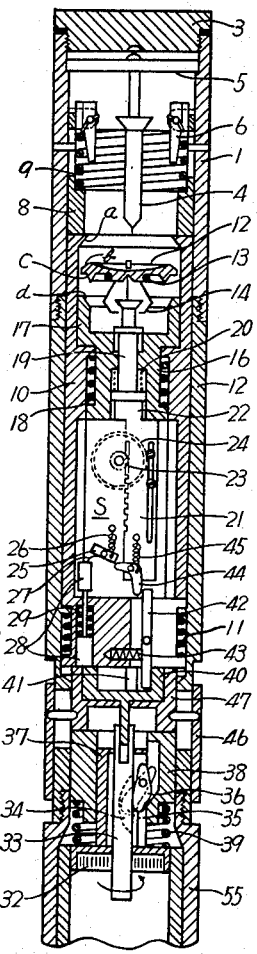
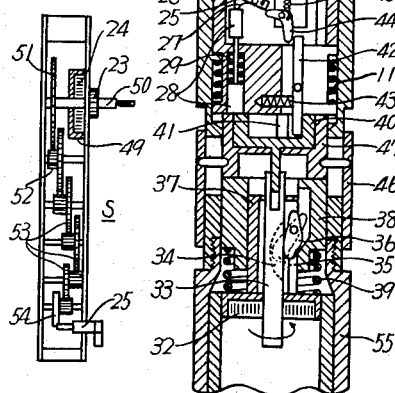
INVENTOR
Ichiro Murata
BY Pierce, Scheffler & Parker
ATTORNEY

United States Patent Office 2,733,519
Patented Feb. 7, 1956

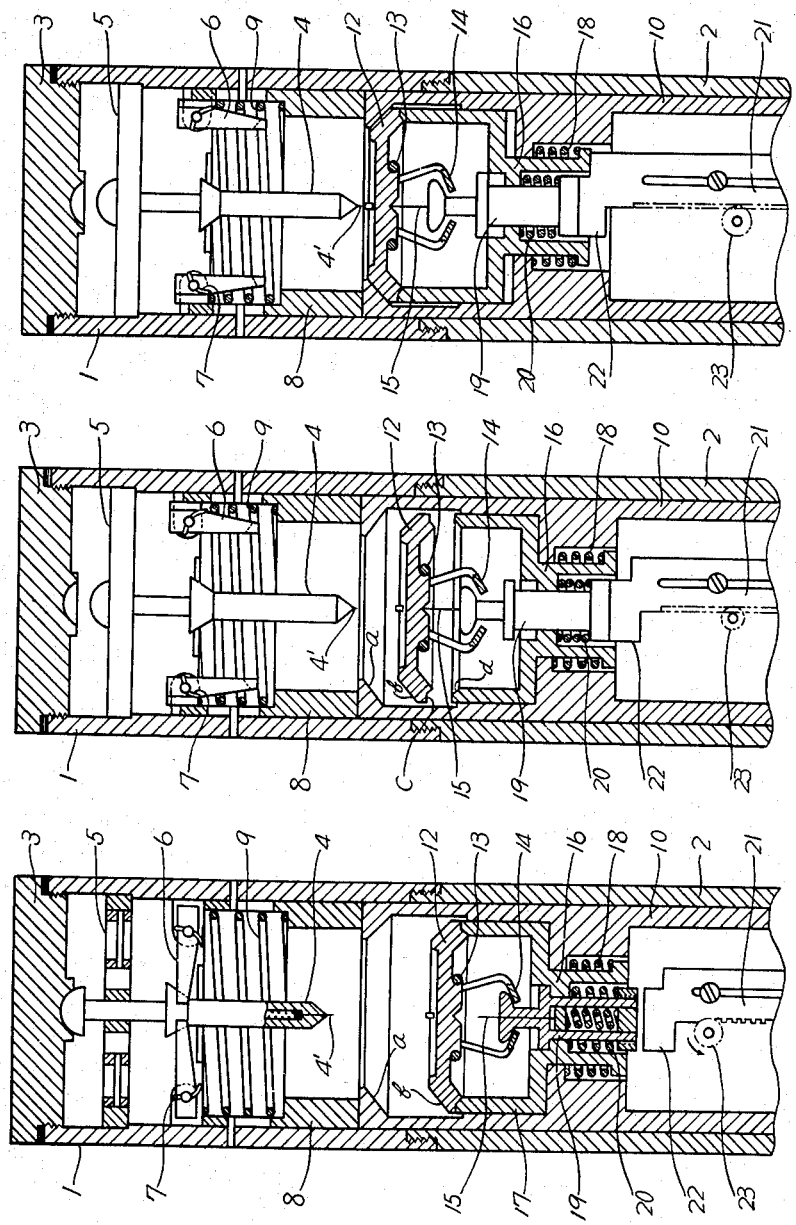

2,733,519

DEEP WELL SURVEYING INSTRUMENT

Ichiro Murata, Higashi Tamachi, Suginami-ku, Tokyo, Japan

Application October 9, 1952, Serial No. 313,963

Claims priority, application Japan October 27, 1951

3 Claims. (Cl. 33—205.5)

This invention relates to an instrument for surveying dip and orientation of a deep well, and more particularly to an instrument for giving direct indication and recording of dip and orientation at a required depth of deep well.

The principal object of this invention is to provide a safe and durable dip indicator which is protected from shock and vibration during the lowering into a deep well.

Another object of this invention is to provide an instrument of this kind which will give direct and exact recording on a chart paper indicating dip and compass direction of the well at any required depth.

In heretofore known instruments of this character having a plumb bob and a compass, no provision was made for protecting the plum bob and the compass and associated parts so that these essential parts would be damaged by shock and collision during lowering and stopping of the instrument into a well casing and there was disadvantage in that the instrument might be damaged or might become unsuitable for use in obtaining an accurate survey. Moreover in known instruments of this kind, the pointed end of the plumb bob perforates the top cover of the compass casing and the record is read through a transparent cover plate with reference to the compass on the opposite side of the cover plate thereby resulting in possible errors in reading due to illusions creatable by observation through the transparent plate.

According to the present invention the above disadvantages can be avoided and it provides an improved dip indicator for deep well surveying, in which the needle point of a plumb bob is impressed on a chart paper attached directly on a recording disc combined with a permanent magnet (hereafter referred to as a magnet disc for the sake of convenience) corresponding to the inclination and compass direction at once so that there occurs no error due to reading the point on the chart through a transparent partition wall with reference to a magnet needle.

Another advantage of this invention is based on the provision of safety locking device for essential members such as the hanging weight and the magnet disc supported by a thin needle, which might be damaged by unavoidable shock and vibration when the instrument is lowered into a deep well. Thus according to the present invention the most important elements, more particularly, the plumb bob and the magnet disc and its associated parts are clamped stationary until the instrument arrives at a predetermined depth in a deep well, and then the plumb bob and the magnet disc are let free after a predetermined time to be supported freely and to rest with their natural condition at the position where the instrument has stopped, then the magnet disc is clamped again under the freely supported condition, and thus the magnet disc having a chart paper put thereon is lifted to strike the plumb bob so that a trace of the needle point is impressed on the paper. Accordingly the plumb bob and the magnet disc can be safely protected from shock and vibration.

For a better understanding of my invention, reference is taken to the accompanying drawings, in which Fig. 1 is an enlarged sectional elevation of the top section of the instrument embodying this invention;

Fig. 2 is a similar sectional elevation showing the parts in a middle position of operation;

Fig. 3 is also similar view showing the parts at the end of operation;

Fig. 4 is a plan view of a chart paper;

Fig. 5 is a sectional elevation of a complete instrument embodying this invention;

Fig. 6 is a similar sectional elevation as Fig. 5 showing the parts in an intermediate stage of operation;

Fig. 7 is a side elevation of the slow motion mechanism.

Same reference numerals show like parts in all views of the drawings.

Now referring to Figs. 1, 2 and 3, numeral 1 designates an upper section of the outer casing which is preferably screwed to a middle section 2 of said casing in order to facilitate the removal of the upper section as desired, the top end being closed by a cover 3. In the upper section, is suspended freely a plumb bob 4 by means of a gimbal 5 secured to the casing 1. According to this invention the plumb bob 4 is normally locked stationary, for instance, against the top cover 3 by means of locking arms 6 which are biased to the upper position to engage the plumb bob by a suitable spring 7. 8 represents an unlocking sleeve for the locking arms 6, slidably fitted in the upper casing 1 and normally biased to the lower position by means of a spring 9, thereby keeping the top edge of the sleeve 8 in spaced relation to the locking arms. It should be noted that when the sleeve 8 moves upwards against the bias of the spring 9 the top edge of the sleeve engages the locking arms to shift them out of engagement with the plumb bob which is then suspended freely by the gimbal.

10 designates an inner casing or frame slidably fitted in the middle section 2 of the casing and normally forced down by a spring 11, the top edge of casing 10 being normally in contact with unlocking sleeve 8. 12 designates a recording disc provided with permanent magnets 13 (in the drawing a set of bar magnets is shown). Hereafter the disc 12 is referred to as a magnet disc, though it is made of non-magnetic material such as plastic material and permanent magnets 13 are embedded or otherwise secured thereto, and the disc has a guide leg 14 projecting downwards therefrom. 17 is a supporting flange for the magnet disc 12, projecting upwards from the clamping sleeve 16 which is normally pressed to the lower position by a spring 18. 15 is a needle for supporting the magnet disc, which is resiliently supported on a small spring in the needle sleeve 19. The needle sleeve 19 is normally biased to the lower position by a spring 20 to clamp the magnet disc 12 on the top edge of supporting flange 17 by the engagement of the top flange of the sleeve 19 with the guide leg 14 of the disc.

21 represents a rack secured to the inner casing 10 slidably along its axial direction such for instance as by means of a slot and studs. The top 22 of rack 21 engages the lower end of the needle holder sleeve 19 and a pinion 23 engages the rack to lift it in the axial direction.

In the device as shown in Fig. 1, now assume the inner casing 10 is moved up in relation to the outer casing 2. Then the sleeve 8 is lifted against the bias of spring 9 to engage the locking arms 6, thereby forcing the latter to the position as shown in Fig. 2. Thus the plumb bob 4 is unlocked and suspended freely from the gimbal 5 in a vertical direction irrespective of the inclination of the outer casing 1. Then if the pinion 23 is turned in the counter-clockwise direction the rack 21 will be moved upwards and acts on the lower end of needle holder sleeve 19 to lift it. When the sleeve 19 is raised the needle 15 will lift up the magnet disc 12 and support it freely under its natural state so that the magnet may take N-S direction. After a certain interval of time during which the movement of rack 21 is stopped, the disc 12 will rest stationary on the needle indicating the zero point or base line on the N-S direction according to the natural tendency of the permanent magnet as shown in Fig. 2.

Then the pinion 23 is restarted to slowly move the rack 21 upward again. In this movement, the conical top *b* of disc 12 will be brought in alignment with the concave inner edge *a* at the top of inner casing 10 to arrest the disc 12 in the condition it was when stationary on the needle. By the further upward movement of rack 21, the sleeve 16 is moved up until its top edge *d* will come in contact with the lower edge *c* of the disc 12, thereby clamping it stationary to the top of inner casing 10 in the manner as shown in Fig. 3 and the rack 21 is stopped.

Under the above condition, if the inner casing 10 is lifted up quickly the disc 12 will strike the plumb bob 4 and the trace of needle 4' will be impressed on a graduated paper previously put on the disc. When the upper section 1 of the casing is removed, one can take out the graduated paper and determine the inclination of the outer casing and its orientation.

The above is the principle of operation caused by the specific features of construction of the instrument according to this invention.

As means for moving the inner casing 10 at a predetermined instant, a suitable clock mechanism can be used and the slow turning of pinion 23 and corresponding lifting of rack 21 can be effected by means of a suitable slow motion mechanism S comprising a series of gear trains acted by the power source of a watch spring. The clock mechanism and the slow motion mechanism should be properly inter-connected by some controlling mechanism in order to attain the above described operation. An embodiment of such mechanisms as applied to the instrument of this invention is shown in Figs. 5 and 6, the latter showing the parts at an intermediate stage of operation.

Referring to Fig. 5, the main elements of the device in the upper and middle sections of the casing are the same as those already described with reference to Fig. 1. The pinion 23 is driven by a slow motion mechanism S which was omitted in Fig. 5 in order to avoid confusion, but shown in Fig. 7, wherein 24 shows a watch spring fixed at one end to the pinion shaft and at the other end to a fixed casing 49. To the pinion shaft 50 is keyed a gear wheel 51 which engages a pinion 52 and successively a series of gear trains 53 and finally a brake wheel 54 which is normally stopped by a stop 25. The spring 24 can be wound up by turning the pinion shaft 50 to act as the motive power.

Referring to Fig. 5, the stop arm 25 is held by a spring 26 to engage the brake wheel 54. 28 is a starting rod slidably fitted to the inner casing 10 and biased by a spring 29 to the lower position from which it is raised, in a manner to be hereinafter described, to act on the arm 25 by means of its spring stop 27 for disengaging the arm 25 from the brake wheel 54.

30 represents a suitable clock mechanism enclosed in the lower section 55 of the outer casing. The clock may be of a known type having a number of gear trains 31 driven by a watch spring 32 as the motive power. It is only necessary to provide a special inter-connection between the above described slow motion device, though such mechanism may be changed in various ways.

33 represents a clock shaft which has a recess 34 to engage cam arms 35 and 36 successively at a predetermined position. The cam arms 35 and 36 are pivoted to the recess of a vertical sleeve 37 fixed to the watch case and act to hold a lifting sleeve 38 by their rear shoulders. The sleeve 38 is fitted on the fixed sleeve 37 to slide axially but to turn therewith by means of a key and is normally forced upward by a spring 39.

To the top of the clock shaft 33 is coupled a cup-shaped member 40 which is rotatable with the shaft, but is slidable along its axis. The member 40 is provided with a slot 41 to receive the lower end of a pivoted lever 42 which is acted upon by a spring 43. A bell crank 44 having a spring 45 is pivoted to the rack 21 to engage the upper end of the lever 42 and to act on the arm 25 to disengage the latter.

46 designates a sleeve which is connected to the inner sleeve 47 which in turn is coupled to the clock shaft 33. When sleeve 47 occupies its lower position it may be rotated thereby rotating clock shaft 33 to its starting position and rewinding the clock spring.

The operation of the instrument embodying this invention will now be explained. It should be noted that the instrument is enclosed in a protective shell when the instrument is lowered in a deep well tube. At first, the plumb bob and magnet disc are locked in the manner as shown in Fig. 5 and the clock should be so adjusted that the instrument can be started after a predetermined time limit corresponding to a desired depth at which the inclination is required to be surveyed.

When the instrument is thus lowered into a well and arrives at a predetermined depth, the recess 34 of clock shaft 33 will come to receive the cam arm 35 by the operation of clock mechanism 30. Then the sleeve 38 is allowed to move upwards by the spring 39 so that the associated parts 47, 40 and 46 are lifted until the sleeve 38 is stopped by the second cam arm 36. By this movement the starting rod 28 acts on the arm 25 to disengage it out of brake wheel 54 (Fig. 7) and the pinion 23 is turned slowly under the control of its series of gear trains. Rack 21 is slowly shifted upwards to engage by its top 22 the lower end of the needle support 19 and the latter is moved up to support on the needle 15 the magnet disc in free state as shown in Figs. 2 and 6. As the rack 21 ascends the bell crank 44 pivoted thereto moves upwards and its left arm engages the stop arm 25 to shift the latter to a position for stopping the rotation of the gear trains so that the pinion 23 is stopped and the upward movement of rack 21 is stopped.

After a short interval of time during which the magnet disc may rest stationary on the needle exactly along the N-S direction under the free state, the notch 41 of the member 40 comes to receive the lower end of lever 42 which is forcd by the spring 43 into the recess to tilt the lever. The upper end of the lever strikes the lower arm of bell crank 44 to disengage it from the stop 25 and to start the slow lifting mechanism and the rack 21 is moved upwards again to lift up the needle holder until the upper periphery *b* of magnet disc is brought to contact with the conical inside periphery *a* at top of the inner casing 10. By the further upward movement of rack 21, the sleeve 16 is moved up against the bias of spring 18 by compressing the needle spring until the upper edge *d* of sleeve 16 comes in contact with the lower periphery *c* of magnet disc to clamp the latter in the stationary position on the exact N-S direction, as shown in Fig. 3.

During the above operation, the clock shaft 33 is turned to such a position that the second cam 36 enters into depression 34 of the shaft 33 to release the sleeve 38. Then the sleeve is lifted up by the force of spring 39 so that the inner casing 10 is quickly raised to strike the plumb bob and the trace of its needle point is impressed on a chart paper 48 previously put on the magnet disc. This point indicates the inclination and compass direction at a required depth in the well. Accordingly when the instrument is lifted up and the upper section 1 is removed one can directly read the required dip and orientation on the chart paper and the record can be taken very easily.

It should be noted that the spring of the slow motion mechanism can be wound up by a thumb piece engaging the axle 50 of pinion 23 from outside of the instrument and there is provided a pawl for preventing unwinding of the spring.

The chart paper 48 has printed thereon the N-S direction and concentric circles indicating the angle of inclination, and has a notch on the north pole or at any other suitable origin to engage a pin projecting from the magnet disc for facilitating easier and exact location of the chart paper.

As it is evident from the foregoing description that according to the present invention the hanging weight and magnet disc as well as their associated parts are clamped in a stationary condition before the instrument is lowered into the well so that the important parts can be protected from damage due to shock and vibration during the lowering operation, and when the instrument has arrived at a required depth in the well the hanging weight and the magnet disc are allowed to attain their free state vertical and north-south positions, respectively and the magnet disc is clamped again in the north-south position corresponding to the location of instrument in the well and then it is forced to strike against the plumb bob so that it has the advantage of assuring positive and correct survey of a deep well.

Having thus described my invention what I claim as new and desire to secure by Letters Patent of the United States is:

1. An instrument for surveying dip and orientation of a deep well, which comprises a freely suspended pointed weight, means for normally clamping said weight in a stationary position, a recording target disc provided with a permanent magnet and adapted to have a chart paper placed thereon, a needle device including a needle for freely supporting said target disc and being provided with spring actuated means for normally clamping said target disc in a stationary position, means for unlocking said clamped weight, means for gradually lifting up said needle support to release said target disc clamping means thereby to support said target disc freely on said needle and enable said target disc to come to rest oriented with respect to the north-south direction, means for thereafter further lifting said needle support and target disc and for clamping said target disc in said rest position, and means for moving said target disc in its clamped state against the point of said freely suspended weight to impress a point on the chart paper on said target disc for providing direct indication and recording of inclination and orientation at a desired depth of a deep well.

2. An instrument adapted for direct indication and recording of dip and orientation of a deep well, which comprises an outer casing, a removable top section having a plumb bob suspended freely by means of a gimbal secured therein and normally locked in a stationary position by means of clamp arms, a sleeve slidably fitted in said top section of the casing adapted to unlock said clamp arms, but normally held in inoperative position by a spring, an inner casing slidably fitted in the outer casing adapted to operate said clamp arm unlocking sleeve and normally held to the lower position by bias of a spring, a supporting sleeve slidably fitted in said inner casing and normally held to the lower position by a spring, a needle support slidably fitted in said supporting sleeve, a magnet disc having engaging lower projections to cooperate with a flange provided for said needle support to clamp said magnet disc on the upper projection of said supporting sleeve, means for shifting the needle support to release the magnet disc to be freely supported on a needle projecting from the support and to rest thereon in the exact N-S direction and then to clamp the disc again against the top periphery of the inner casing, a clock mechanism arranged to control the operation for a predetermined time interval for releasing the clamp arms of plumb bob and said means for clamping the magnet disc and finally for striking said disc against said plumb bob in the locked condition to impress a needle point on a chart paper previously put on said disc for the indication of dip and orientation at a required depth in the deep well.

3. An instrument adapted for direct indication and recording of dip and orientation of a deep well, which comprises an outer casing having upper, middle and lower sections, a weight freely suspended by means of a gimbal in the upper section of the casing, means for clamping said weight in a stationary condition, a sleeve slidably fitted in the upper section of said casing adapted to unlock said clamping means, an inner casing slidably fitted in the middle section of said outer casing adapted to act on said unlocking sleeve, but normally biased to its lower inoperative position by a spring, a target disc fitted with a permanent magnet, a needle sleeve having a needle therein for supporting said target disc, a clamping sleeve for said disc slidably fitted in said inner casing and normally biased to the lower position by a spring and having an upper projection adapted to engage said target disc, said needle sleeve being slidably fitted in the clamping sleeve and including an upper portion normally spring biased into engagement with and urging said target disc against the projection on said clamping sleeve thereby to normally clamp said disc in a stationary position, a slow motion mechanism adapted to lift said needle sleeve and said disc clamping sleeve, a clock mechanism enclosed in the lower section of the outer casing having a revolving spindle projecting upwardly, and an interconnection between said slow motion mechanism and said clock mechanism comprising a starting device of said slow motion mechanism, a lifting sleeve adapted to move upwards under control of said clock spindle after a predetermined time interval for operating a starting sleeve to engage said starting device of said slow motion mechanism, a device for stopping the slow motion mechanism for a short interval after it has started and re-starting said mechanism, and a device for finally unlocking said lifting sleeve to lift up said inner casing together with its associated parts to strike said target disc against said suspended weght.

References Cited in the file of this patent
UNITED STATES PATENTS

| | | |
|---|---|---|
| 1,738,589 | Koppl | Dec. 10, 1929 |
| 1,803,785 | A Bler | May 5, 1931 |
| 2,232,360 | Barnett | Feb. 18, 1941 |
| 2,240,417 | Ring | Apr. 29, 1941 |